UNITED STATES PATENT OFFICE.

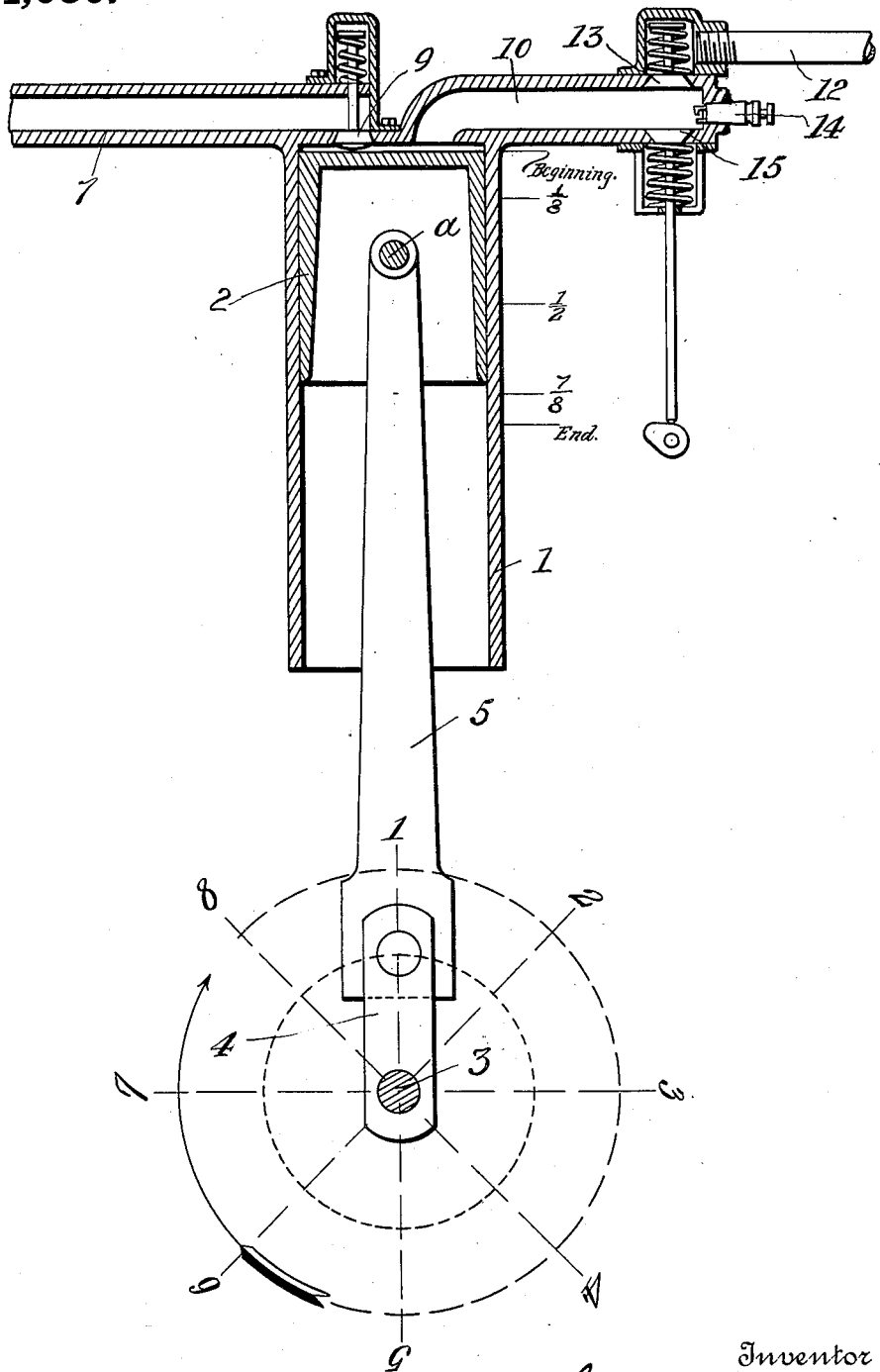

GUSTAV A. BACHMANN, OF BALTIMORE, MARYLAND.

METHOD OF COMBINING AIR AND GAS AND UTILIZING THE SAME IN AN INTERNAL-COMBUSTION ENGINE.

1,054,080.  Specification of Letters Patent.  Patented Feb. 25, 1913.

Application filed February 24, 1911. Serial No. 610,461.

*To all whom it may concern:*

Be it known that I, GUSTAV A. BACHMANN, a citizen of the United States, and resident of Baltimore, Maryland, have invented an Improved Method of Combining Air and Gas and Utilizing the Same in an Internal-Combustion Engine, of which the following is a specification.

This invention consists in a novel method of producing in the cylinder of an internal combustion engine, at a fractional part of the active or work-producing stroke of the piston, a mixture of hydro-carbon and atmospheric air in such proportions that the composition will consist of a practically true explosive gaseous body at a higher tension or pressure than that effected in the previous return or compression stroke of the piston.

In carrying out my improved method, I preferably use as the main gaseous supply, a mixture of hydro-carbon and air in which the proportion of air in the same is less than that necessary to produce complete combustion when the composition is ignited, and reinforce the said compressed mixture at the time of its greatest compression, with atmospheric air at a still higher tension or state of compression, and continue the admission of the said air until the piston has reached a fractional part of its stroke which has been previously selected as the point where ignition of the gases is to take place, when the influx of air is suspended and the mixture exploded by any approved means. By this method I not only maintain in the cylinder for a portion of the stroke of the piston an inflammable gaseous body at a pressure which at all times is in excess of that due to compression by the piston, but avail myself of the advantages of the angular position of the crank at the time of explosion.

In the further description of the said invention which follows reference is made to the accompanying drawing forming a part hereof which is a sectional diagrammatic view of certain parts of an internal combustion engine.

In the said drawing, 1 represents the cylinder, 2 the piston and 3 the shaft of the engine.

The crank is designated by 4 and the connecting rod which unites the crank pin with the pin *a* of the piston, by 5.

7 is a pipe which connects the upper end of the cylinder 1 with a source of supply of air under a pressure which is greater than that of the gas within the cylinder when the piston 2 has reached the limit of its compression stroke.

Suitable valve mechanism not shown will be employed in connection with the pipe 7 to place the gas compressed in the cylinder at the completion of the compression stroke of the piston in communication with the stored air at a higher tension; and the pipe 7 has a check valve 9 therein which opens automatically to allow of the admission of the stored air to the cylinder, and at the same time prevent the products of combustion of the gases in the cylinder entering the said pipe.

10 is a combustion chamber opening into the cylinder 1, which receives gas and air from the supply pipe 12. The check valve 13 admits the gaseous mixture to the cylinder during the suction stroke of the piston, but prevents its return. The combustion chamber has also a valve 15 which is mechanically opened at the termination of the active or work-producing stroke of the piston, to allow of the escape of the products of combustion from the engine cylinder and the combustion chamber.

In the diagram, the numerals 1 to 5 indicate the position of the crank pin during four parts of its half rotation, and the fractions $\frac{1}{8}$, $\frac{1}{2}$ and $\frac{7}{8}$ represent the fractional parts of the stroke of the piston corresponding with the numbers 2, 3 and 4 respectively.

14 is a gas igniting device of ordinary description situated in the combustion chamber 10.

From the foregoing it will be understood that the piston during the fractional portion of its active or work-producing stroke, or until the explosion of the gases takes place, is under a uniform pressure which is greater than that to which it is subjected at the termination of the compression stroke, and that the power expended in compressing the air in the air reservoir, is returned in work performed by the piston in the cylinder before the explosion of the combustible mixture of gases, except the loss due to friction.

I claim as my invention,—

1. The method of combining air and gas and utilizing the same in an internal combustion engine, which consists in first compressing a mixture of air and gas in the engine cylinder by means of the piston, then increasing the pressure of the compressed mixture in the cylinder, by the addition thereto of air at a higher pressure and maintaining the increased pressure during a part of the active or work-producing stroke of the piston, and then suspending the admission of the said air and exploding the reinforced mixture.

2. The method of combining air and gas and utilizing the same in an internal combustion engine, which consists in first compressing a mixture of air and gas in the engine cylinder by means of the piston, then admitting to the compressed mixture, air at a higher pressure and continuing the said admission of air during a part of the active or work-producing stroke of the piston, and then suspending the admission of the said air and exploding the reinforced mixture.

GUSTAV A. BACHMANN.

Witnesses:
JULIA B. ROBINSON,
WM. T. HOWARD.